(12) United States Patent
Andreina et al.

(10) Patent No.: US 12,126,743 B2
(45) Date of Patent: Oct. 22, 2024

(54) METHOD FOR SUPPORTING SHARING OF TRAVEL HISTORY OF TRAVELERS IN AIRPORTS

(71) Applicant: NEC Laboratories Europe GmbH, Heidelberg (DE)

(72) Inventors: Sebastien Andreina, Heidelberg (DE); Ghassan Karame, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 205 days.

(21) Appl. No.: 17/793,430

(22) PCT Filed: Mar. 2, 2020

(86) PCT No.: PCT/EP2020/055478
§ 371 (c)(1),
(2) Date: Jul. 18, 2022

(87) PCT Pub. No.: WO2021/175409
PCT Pub. Date: Sep. 10, 2021

(65) Prior Publication Data
US 2023/0040025 A1     Feb. 9, 2023

(51) Int. Cl.
*H04L 9/00* (2022.01)
*H04L 9/08* (2006.01)
*H04L 9/30* (2006.01)

(52) U.S. Cl.
CPC ............ *H04L 9/50* (2022.05); *H04L 9/0819* (2013.01); *H04L 9/30* (2013.01)

(58) Field of Classification Search
CPC . H04L 9/40; H04L 9/50; H04L 9/0819; H04L 9/0825; H04L 9/0838; H04L 9/085; H04L 9/30
See application file for complete search history.

(56) References Cited

U.S. PATENT DOCUMENTS 10,547,454 B2 * 1/2020 Beaman ............... H04W 4/35
10,789,590 B2 * 9/2020 Tran ..................... H04L 9/3236
(Continued)

FOREIGN PATENT DOCUMENTS

EP    3 496 332 A1   6/2019
WO    2020/192948 A1   10/2020

OTHER PUBLICATIONS

Li, Wenting et al.; "Towards Scalable and Private Industrial Blockchains"; Proceedings of the ACM Workshop on Blockchain, Cryptocurrencies and Contracts; Apr. 2, 2017; pp. 9-14; XP055397747; ISBN: 978-1-4503-4974-1; Association for Computing Machinery (ACM); New York City, USA.

*Primary Examiner* — Hosuk Song
(74) *Attorney, Agent, or Firm* — Leydig, Voit & Mayer, Ltd.

(57) ABSTRACT

A method for supporting sharing of travel history of travelers in airports includes receiving, by a trusted entity of the distributed ledger system, a registration request from a traveler via a traveler application. The registration request provides personal information of the traveler to the trusted entity. The method further includes generating, by the trusted entity, a public key for the traveler using an identity-based encryption mechanism and sending, from the trusted entity to the global identity blockchain, a registration transaction with respect to the traveler. The registration transaction comprises the public key of the traveler. The method further includes recording a travel history that includes all travel tickets of the traveler, wherein a Merkle tree of all the travel tickets of the traveler is generated. The Merkle tree has a Merkle root, and the Merkle root of the Merkle tree is stored in the global identity blockchain.

12 Claims, 1 Drawing Sheet

(56) References Cited

U.S. PATENT DOCUMENTS

| | | | |
|---|---|---|---|
| 11,288,280 B2 * | 3/2022 | Padmanabhan | H04L 9/3231 |
| 11,573,976 B2 * | 2/2023 | Sharma | G06Q 20/382 |
| 11,579,239 B2 * | 2/2023 | Meadow | H04W 12/63 |
| 11,645,920 B2 * | 5/2023 | Carraway | H04L 9/3239 |
| | | | 701/120 |
| 11,770,296 B2 * | 9/2023 | Nolan | H04L 69/22 |
| | | | 370/252 |
| 11,880,836 B1 * | 1/2024 | Nemethi | H04L 9/3218 |
| 2017/0257358 A1 | 9/2017 | Ebrahimi et al. | |

* cited by examiner

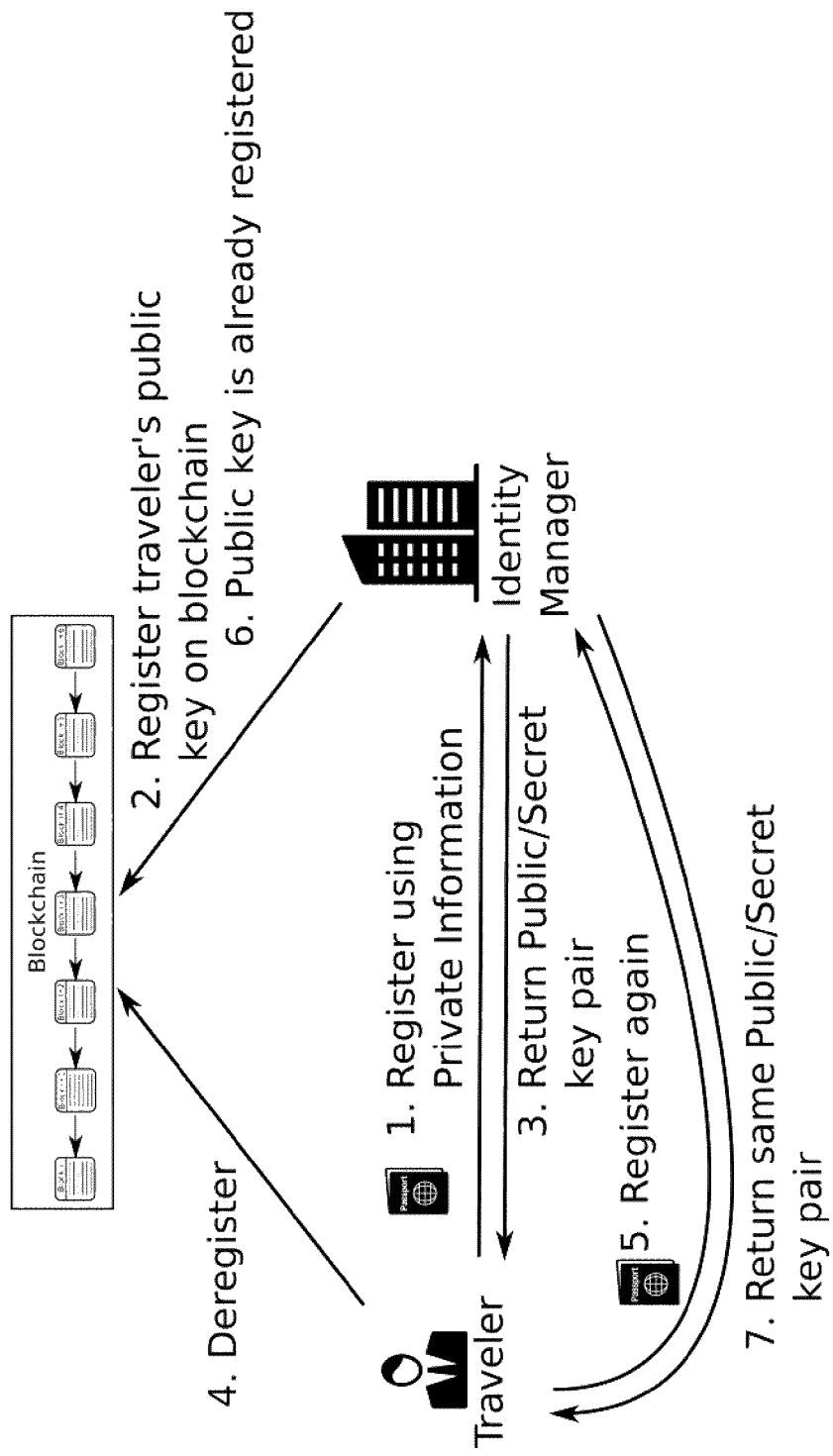

US 12,126,743 B2

METHOD FOR SUPPORTING SHARING OF TRAVEL HISTORY OF TRAVELERS IN AIRPORTS

CROSS REFERENCE TO RELATED APPLICATIONS

This application is a U.S. National Phase application under 35 U.S.C. § 371 of International Application No. PCT/EP2020/055478, filed on Mar. 2, 2020. The International Application was published in English on Sep. 10, 2021, as WO 2021/175409 A1 under PCT Article 21(2).

FIELD

The present disclosure relates to a method for supporting sharing of travel history of travelers in airports.

BACKGROUND

Airports are very complex systems through which millions of people travel every day. Their complexity has reached a point where a traveler can hardly understand what is going on behind the scenes. What seems a straightforward workflow—drop your luggage at check-in counter, go through metal detectors, board the plane, disembark, retrieve your luggage—is in reality made possible by many processes working in unison to make it all happen. One such process is identity management. Indeed, the identity of every passenger/traveler has to be verified in order to ensure that the traveler is not dangerous, and that the traveler really is who he claims to be. Therefore, at each checkpoint, the traveler has to show some valid ID (e.g., a passport), a valid ticket, and possibly a valid entry visa if the country of destination requires one (e.g., ESTA: Electronic System for Travel Authorization).

Thus, in recent years, many proposals aim at simplifying air travels by making it seamless for the passenger/traveler, and less error prone for the stakeholders. Examples of such proposals are OneID for aviation from IATA (further information is retrievable at https://www.iata.org/en/programs/passenger/one-id/), or the Know your Traveler Digital Identity (KTDI) initiative from the World Economic Forum (further information is retrievable at https://www.weforum.org/reports/the-known-traveller-unlocking-the-potential-of-digital-identity-for-secure-and-seamless-travel). Those solutions rely on the digitalization of the identity of the travelers to simplify data sharing and automatizing some of the air travel processes.

An aviation system encompasses many different stakeholders that do not necessarily trust each other; therefore, it is suitable to be enhanced using blockchain technology as a trustless data sharing platform. Blockchain provides trustless decentralized sharing of data and information for the stakeholders and self-sovereign identity management for the travelers. In a blockchain based seamless travel system, the use of the blockchain technology encompasses at least the identity verification and self-sovereign identity management. While additional information on the travel history and current status of the passenger might be wishful, it is not always possible to share it while preserving the privacy of the travelers.

Typically, the travel history of a traveler is of utmost importance for the immigration offices in order to allow them to judge the trustworthiness of the traveler. At the same time, this information contains a lot of personal information and should not be disclosed and available for everyone to access.

SUMMARY

In an embodiment, the present disclosure provides a method for supporting sharing of travel history of travelers in airports. Identities of the travelers is managed using a distributed ledger system, and the distributed ledger system includes a global identity blockchain and several per segment security blockchains. The global identity blockchain is accessible by entities of the distributed ledger system, and a per segment security blockchain is employed for a predetermined flight segment such that the per segment security blockchain is accessible only by entities of the distributed ledger system that are involved in the predetermined flight segment. The method includes receiving, by a trusted entity of the distributed ledger system, a registration request from a traveler via a traveler application. The registration request provides personal information of the traveler to the trusted entity. The method further includes generating, by the trusted entity, a public key for the traveler using an identity-based encryption mechanism. The public key is based on the personal information of the traveler. The method additionally includes sending, from the trusted entity to the global identity blockchain, a registration transaction with respect to the traveler. The registration transaction comprises the public key of the traveler in order to be registered in the global identity blockchain. Finally, the method includes recording a travel history that includes all travel tickets of the traveler, wherein a Merkle tree of all the travel tickets of the traveler is generated. The Merkle tree has a Merkle root, and the Merkle root of the Merkle tree is stored in the global identity blockchain.

BRIEF DESCRIPTION OF THE DRAWINGS

Subject matter of the present disclosure will be described in even greater detail below based on the exemplary FIGURES. All features described and/or illustrated herein can be used alone or combined in different combinations. The features and advantages of various embodiments will become apparent by reading the following detailed description with reference to the attached drawings, which illustrate the following:

FIG. 1 is a schematic view illustrating a registration workflow for a method according to an embodiment of the invention.

DETAILED DESCRIPTION

There is a need for providing trusted travel history to travelers in airports. A simple solution might be to openly store the travel history of each traveler on a common blockchain. However this would violate the travelers' privacy. Similarly, if the travel history simply has to be sent by the traveler, nothing prevents them from cherry picking the travels they want to share, therefore making the list untrustworthy. This approach has big drawbacks, namely lack of privacy and respectively possibility for travelers to tamper or selectively disclose the travel history. Furthermore, it would be possible for travelers to manipulate their travel history by registering multiple times with different accounts.

In view of the above, the present disclosure improves and further develops a method of the initially described type for supporting sharing of travel history of travelers in airports in such a way that the sharing of the travelers' travel history is improved, in particular in terms of enhancing security and increasing efficiency.

A method is provided for supporting sharing of travel history of travelers in airports, wherein the travelers' identity is managed using a distributed ledger system, wherein the distributed ledger system includes a global identity blockchain and several per segment security blockchains, wherein the global identity blockchain is accessible by entities of the distributed ledger system, and wherein a per segment security blockchain is employed for a predetermined flight segment, such that the per segment security blockchain is accessible only by entities of the distributed ledger system that are involved in the predetermined flight segment. The method includes receiving, by a trusted entity of said distributed ledger system, a registration request from a traveler via a traveler application, wherein the registration request provides personal information of the traveler to the trusted entity; generating, by the trusted entity, a public key for the traveler using an identity-based encryption mechanism, wherein said public key is based on the personal information of the traveler; sending, from the trusted entity to the global identity blockchain, a registration transaction with respect to the traveler, wherein the registration transaction comprises the public key of the traveler in order to be registered in the global identity blockchain; recording a travel history that includes all travel tickets of the traveler, wherein a Merkle tree of all the travel tickets of the traveler is generated, wherein the Merkle tree has a Merkle root, and wherein the Merkle root of the Merkle tree is stored in the global identity blockchain.

According to the present disclosure, it has first been recognized that an enormous improvement with regard to an efficient and private sharing of travelers' travel history can be achieved by leveraging blockchain technology between main entities/participants of the air travel security. According to the disclosure, a distributed ledger system is used, wherein the distributed ledger system includes a global identity blockchain and several per segment security blockchains. The global identity blockchain is accessible by all entities/participants of the distributed ledger system. With regard to the per segment security blockchains, a per segment security blockchain is employed for a predetermined flight segment, wherein the per segment security blockchain is accessible only by entities that are involved in the predetermined flight segment. Taken this configuration into consideration, according to the invention, a traveler sends via a traveler application, deployable on mobile device of the traveler, a registration request to a trusted entity of the distributed ledger system. The registration request provides personal information of the traveler to the trusted entity. Then, the trusted entity generates a public key for the traveler using an identity-based encryption mechanism. The public key is a unique information about the traveler's identity in the distributed ledger system. Further, the public key is based on the personal information of the traveler. The global identity blockchain receives a registration transaction with respect to the traveler, wherein the registration transaction is issued by the trusted entity. The registration transaction comprises the public key of the traveler in order to be registered and recorded in the global identity blockchain. Furthermore, a travel history that includes all travel tickets of the traveler is recorded, wherein a Merkle tree of all the travel tickets of the traveler is generated. The Merkle tree has a Merkle root, which is stored in the global identity blockchain. Thus, the sharing of the travel history becomes straight forward: the traveler simply provides access to a designated third party to all of his tickets. The third party, being an entity of the distributed ledger system, can simply recompute the Merkle tree to ensure correctness and be convinced that the traveler did not modify or omit any travel ticket.

Thus, the present disclosure provides a method for supporting sharing of travel history of travelers in airports, wherein the sharing of the travelers' travel history is improved, in particular in terms of enhancing security and increasing efficiency of the information sharing.

In particular, an embodiment of the present disclosure provides Sybil resistance by using identity based encryption (IBE). For the travel history of a traveler, Sybil resistance is of utmost importance, otherwise travelers could discard their travel history by simply creating a new identity on the blockchain. According to embodiments, the use of IBE provides the guarantee that the travelers will always have the same public key and therefore will be unable to discard their travel history by registering again.

Thus, embodiments of the present disclosure provide methods for ensuring private and integral sharing of travel history in existing blockchain technologies.

The term "travel history" is to be understood in the most general sense and may refer to information that represents all flights that a traveler has made. Thus, for example, the travel history may include all the travel tickets of a traveler.

The terms "entity", "airline entity" and "immigration office entity" may refer each to a device adapted to perform computing like a personal computer, a tablet, a mobile phone, a server, or the like and comprises one or more processors having one or more cores and may be connectable to a memory for storing one or more applications which is/are adapted to perform corresponding steps of one or more of the embodiments. Any application may be software-based and/or hardware-based installed in the memory on which the processor(s) can work on. The devices, entities or the like may be adapted in such a way that the corresponding steps to be computed are performed in an optimized way. For instance different steps may be performed in parallel with a single processor on different of its cores. Further the entities may be identical forming a single computing device. The device or devices may also be instantiated as a virtual device running on a physical computing resource. Different devices may therefore be executed on said physical computing resource. In other words the above mentioned terms of "entity" may be understood as any kind of physical or virtual computing entity or computing entities and may include, but are not limited to the following: an application running on a computer, a microprocessor, a single, dual, quad or octa-core processor or processors or the like or a computer, processor, or the like with a memory. Said application, computer or processor may have one or more interfaces, ports or the like for communication with other devices, entities, ports, interfaces or the like.

The term "transaction" is to be understood in the most general sense and may refer to information sent or transmitted into the network, e.g. to nodes connected to the node sending said transaction. Said transaction may be provided in form of a message, a data packet or the like and may comprise information for the recipients of said transaction.

The term "blockchain" may be understood as a distributed database maintaining a continuously growing list of data records that are hardened against tampering and revision even by operators of the data storing nodes hosting database. A blockchain comprises for example two kinds of records: so-called transactions and so-called blocks. Transactions may be the actual data to be stored in the blockchain and blocks may be records confirming when and in what sequence certain transactions became journaled as a part of the blockchain database. Transactions may be created by participants and blocks may be created by users who may use specialized software or equipment designed specifically to create blocks.

According to embodiments, a per segment security blockchain may rely on the global identity blockchain for the management of the travelers' identity: travelers are only required to register once on the global identity blockchain. Then, e.g. upon a ticket registration transaction, a per segment security chain can retrieve the traveler's registration from the global identity blockchain in order to ensure that the traveler ID is a correct ID and to retrieve the public key of the traveler for further verification of traveler's signatures. Different per segment security chains may also exchange information through asset transfer, for example, as described in the non-patent literature of Li, A. Sforzin, S. Fedorov and G. O. Karame, "Towards scalable and private industrial blockchains" in Proceedings of the ACM Workshop on Blockchain, Cryptocurrencies and Contracts, 2017. Further, it may be provided that this can also be used to share data from a security chain to the global identity blockchain.

According to embodiments, the personal information of the traveler provided to the trusted entity may include information that is uniquely associated with the traveler. For example, the personal information may include a passport number, date of birth and/or name of the traveler. Thus, for example, this information may then be used to create a key pair for identity-based encryption (IBE).

According to embodiments, the trusted entity generating the public key for the traveler may provide a unique key pair (pk, sk) that identifies the traveler in the distributed ledger system. In this regard key pk represents the public key that is recorded in the global identity blockchain. The key sk represents a secret key that is returned to the traveler, wherein the secret key sk is employed as decryption key. Since the public key is derived from the private data (personal information) of the traveler, if the traveler unregister and tries to register again at a later date, he will receive the same public key. This can ensure that the traveler cannot forgot his travel history.

According to embodiments, the registration of the traveler's public key in the global identity blockchain may provide an account on which the travel history of the traveler is able to be shared by entities of the distributed ledger system. This can ensure that the travel history cannot be modified by the traveler and provides integrity protection for the travel tickets.

According to embodiments, the trusted entity of the distributed ledger system may be an airline entity. Furthermore, the trusted entity may be any entity that acts as an Identity Manager. This is required in order to ensure each traveler can only register once.

According to embodiments, the per segment security blockchain may receive a new ticket transaction that is issued by an airline entity of the per segment security blockchain, wherein the ticket transaction comprise information on the identity of the traveler and information on the time of journey.

According to embodiments, the traveler may grant/provide access to a set of travel tickets of the traveler to an entity of the per segment security blockchain.

According to embodiments, the entity of the per segment security blockchain may recompute the Merkle tree of the traveler based on the set of travel tickets in order to check whether any travel ticket is missing or has been modified. Since the root of the Merkle tree of the travel history is stored on the blockchain, the traveler might modify or omit travels. Hence, the check may ensure and/or improve the integrity and correctness of the travel history and the system.

According to embodiments, the entity of the per segment security blockchain may recompute the Merkle tree of the traveler based on the set of travel tickets in order to check whether any travel ticket is missing or has been modified. This provides a possibility to verify the travel history of the traveler. Thus, the check may ensure and/or improve the integrity and correctness of the travel history and the system.

According to embodiments, an airline entity of the per segment security blockchain may issue an update Merkle tree transaction for the traveler, wherein the update Merkle tree transaction includes the new travel ticket. Thus, the integrity and correctness of the travel history and the system may be ensured and/or improved.

According to embodiments, the airline entity issuing the update Merkle tree transaction may update the traveler's Merkle root that is recorded in the global identity blockchain. Thus, since the airline updates the Merkle root, it prevents the traveler from removing unwanted previous travels.

According to embodiments, it may be provided that all airline entities of the distributed ledger system are configured to support trusted execution environments, TEEs', such that one trusted execution environment, 'TEE', is provided per airline, and wherein all airlines form a ring signature system using their TEEs. Thus, it may be provided that a transaction is signed using the ring signature in order to ensure that one cannot know from which airline the signature was sent from. Hence, ring signature may enable and/or ensure that one does not know who created the transaction.

According to embodiments, it may be provided that the travel tickets of the traveler are stored in a secure cloud storage. Thus, data persistence may be improved and/or ensured.

According to embodiments, cloud storage may be used to store the travel tickets. The root of a Merkle tree of all the travel tickets of the travelers is stored in the global identity blockchain in order to provide high integrity and trust. Since one cannot trust the traveler to not try to tamper with his history, the travel history recorded in the blockchain can only be modified by an external party.

Further features and advantages and further embodiments are described or may be become apparent in the following:

According to an embodiment, the distributed ledger system may be composed of a centralized airline hub and multiple blockchains. A blockchain is a peer-to-peer overlaid network that consists of multiple nodes/entities, which, through a distributed consensus protocol, collaboratively maintain a distributed ledger. The content of the ledger is replicated among all the nodes/entities of the distributed ledger system so that the blockchain network provides robustness against the corruption of some nodes.

Messages, which may also be designated as transactions, are propagated among the nodes of the distributed ledger system to update the state of the ledger. Nodes who actively maintain the ledger are denoted as validators, as they validate transactions and participate in the consensus process in order to update the ledger. The other nodes that simply passively get updates of the ledger are called non-validators.

According to an embodiment, the proposed method may be used along with a Digital Identity for Aviation based on blockchain deployment. Such a deployment has a goal to provide seamless travel for travelers and increased security for the different stakeholders. Indeed, in such a deployment, the traveler would be required to register only once into the system, after which, in the optimal case, travelers would not have to show their passport or boarding pass to any security check in any participating airport. Such solution usually uses some biometric identification, such as face recognition, to seamlessly identify the travelers, while the blockchain is used to share the data between the different stakeholders as well as ensure its authenticity and integrity.

Typically, the blockchain may store some information asserting that the identity of the traveler has been verified, i.e. his passport is valid, the face matches, etc. The main goals of such a deployment is to improve the user experience of the travelers, while reducing the costs of the stakeholders and increasing the security of the system.

It may be provided that such a deployment would include as a node of the blockchain every airport, airline and immigration office of the participating countries. The embodiment may use a blockchain technology that provides an architecture similar to Satellite Chain as described in the non-patent literature of Li, A. Sforzin, S. Fedorov and G. O. Karame, "Towards scalable and private industrial blockchains" in Proceedings of the ACM Workshop on Blockchain, Cryptocurrencies and Contracts, 2017.

A satellite chain architecture allows the creation of many distinct blockchains that comprise a possible different set of peers that are interoperable, i.e. cross chain transactions are possible. Furthermore, each blockchain may run its own consensus algorithm, effectively improving the scalability of the system. Those interoperable blockchains may be designated as satellite chains.

According to an embodiment, it may be provided that there are two types of satellite chains: a single unique global identity blockchain, and a multitude of per segment security chains. All entities participating in the Digital Identity for Aviation based on blockchain, i.e. the participating airlines, airports and immigration offices, would join this global identity blockchain. The global identity blockchain may be used to record information about the registration of the different users and is the base of the digital identity of the travelers. On the other hand, the per segment security chains would contain only the departure and arrival airports/governments as well as the airline of a given flight segment. A per segment security chain will record all the information regarding the passenger for the given flight. Those records may comprise, for example, the result of a prescreening from the immigration offices, or the current status of the passenger. The per segment security chain may be mainly used to handle and automatize the logic of the traveler/passenger management and which would reduce the possibility of human errors.

Since the global identity blockchain is the only chain that is accessible to everyone, it is where the travel history of the traveler is to be shared. However, since the global identity blockchain may be accessed by many different entities, it is important that the information shared is completely confidential to everyone except for the parties with whom the traveler has disclosed it.

Given that the history of the traveler is linked to his registration, it is important to prevent the traveler registering many accounts and fly only once with each account, in order to prevent the population of his travel history.

Thus, for an embodiment, it may be enforced that only one public key (and therefore account) per traveler is provided by using an identity-based encryption (IBE) mechanism. IBE is a cryptographic primitive that allows the public key of a traveler to be a known string, such as his email address. Making the public key of the traveler derived from some deterministic personal information of the traveler, such as his passport number, date of birth, etc. will enforce that even if the traveler tries to register multiple times, the traveler will not be able to create different accounts. According to the embodiment, the public key of travelers will therefore be generated using IBE, managed by a centralized entity such as the Airline Hub or a local government.

In order to improve security and privacy of the travelers, it may be provided that the airlines' peers are further required to support a Trusted Execution Environment (TEE) such as Intel SGX (further information is retrievable at https://www.intel.com/content/www/us/en/architecture-and-technology/software-guard-extensions.html). TEEs are hardware components of the CPU that provides high confidentiality and integrity to an application, even in case of malicious operating systems. The airlines of the distributed ledger system may form a ring signature system using their TEEs and this will be used to share information about the travel history of the travelers.

Ring signatures are a type of digital signature that can be performed by any member of a group of users that each has a key. To verify the signature, there is only one public key, and it is not possible to discover which exact member performed the signature.

According to an embodiment, a traveler software application may be provided. The traveler application, deployable in mobile devices, may act as the traveler's interface to the distributed ledger system, allowing him to register to the system, book flights, query the status of his travel, show notifications about important updates regarding his travel and more importantly: to share his travel history. Upon installation of the traveler application a unique public key/secret key pair (pk, sk) may be generated that from now identifies the traveler in the distributed ledger system is generated. The unique public key/secret key pair (pk, sk) may be generated and received by a trusted entity such as an airline entity.

According to an embodiment, a global identity blockchain may be provided. The global identity blockchain, or identity chain, is the main system's chain. Its purpose is to record information about travelers. In particular, it records in the shared ledger the public key of the traveler. The registration of the public key will create an account on which the travel history of the traveler may be shared. Every actor in the distributed ledger system has access to this global identity blockchain, with travelers being light client able to query and receive notifications.

Embodiments describe a method for supporting sharing of travel history of travelers in airports. According to an embodiment, a protocol may be implemented, wherein the protocol may have steps as follows:

Generating a Public Key

An airline hub (or a local government) has a master secret key that is to be used with identity-based encryption (IBE). Travelers can then register to the distributed ledger system by providing their personal information to the airline hub, which will return their public key and secret key. Since the public key of the traveler is generated using his personal data, even if the traveler tries to register again, the traveler will receive the same public key. Thus, this procedure effectively prevents Sybil attacks.

Registering the Public Key

The registration of the travelers is directly issued by a centralized party, such as an airline entity, issuing the credentials. This way other parties can be ensured that the key has been generated properly. Third parties can further verify the public key of the travelers upon gaining access to their private data. This information is not publicly verifiable as it would require the personal information on a traveler to be publicly accessible, and therefore would leak his privacy, however it is easy for a third party to verify the public key of the travelers upon gaining access to his data.

Record Travel History

The travel history of the traveler consists of all his travel tickets. The integrity of the travel tickets of the travelers is furthermore ensured through the means of a Merkle tree. On the global identity blockchain, the account of each traveler comports a field reserved for the root of the Merkle tree of the traveler's travels. Since the traveler could cheat and remove some tickets when updating the Merkle tree on the global identity blockchain, this value is instead updated by the airline entity. However, using a secret key of the airline to update the Merkle tree commitment of the traveler would harm the traveler's privacy as it would become easier to try to deanonymize a traveler based on the airlines he uses. Therefore, it may be required that all airlines use a Trusted Execution Environment (TEE). The TEEs of all the airlines may collaborate to create a ring signature. Thanks to the high computing trust of the TEEs, a simplified ring signature could be implemented by having one airline's TEE generate a signing key and sharing it with all the other airlines. Subsequently, all the airlines will use this key to sign the travel history Merkle tree update of the travelers, effectively achieving anonymity with respect to the signer of the transaction. The tickets of the traveler can be stored either directly on the mobile traveler application of the traveler, or by using a more advanced system such as having a secure cloud storage that would provide resilience against crash faults. In case the tickets are to be stored on a cloud storage, proper encryption would ensue.

Share Travel History

Sharing the travel history becomes straight forward: the traveler simply provides access to the designated third party to all of his tickets. The third party can simply recompute the Merkle tree to ensure correctness and be convinced that the traveler did not modify or omit any travel ticket.

Thus, embodiments of the invention provides a solution to the problem of creating a trusted history in the Digital Identity for Airline use case. The embodiments may provide an improvement with respect to complexity and trust requirement compared to the prior art. Embodiments of the invention may allow the traveler to either not show his history, or show it completely, as if anything is missing, it will be directly rejected by the receiving entity, effectively achieving an All or Nothing travel history.

Furthermore, at least one embodiment of the invention may have at least one of the following advantages:
  Preventing sibyl attacks during ID creation by using encryption with a deterministic public key schema.
  Ensuring all-or-nothing travel history disclosure by storing Merkle root of off-chain authenticated Merkle trees
  Allowing efficient information sharing without any key management required.
  Offer high privacy to travelers through anonymity, and third parties that gain access to the information are able to be convinced that the travelers did not omit some of the data nor tampered with some of them.
  Applied to the blockchain based Seamless Travel for Airports, it is allowed to record securely and confidentially the travel history of the travelers while ensuring that upon granted access to the travel history, the different parties can be convinced of the integrity and validity of the travel history.
  Improving the security and the privacy of Blockchain based OneID for airport, effectively enabling seamless travel experience for passengers while tightening security.

Embodiments provide an information sharing process based on blockchain that would allow to record series of events about a traveler in a privacy preserving way: the different events are completely unlinkable unless the traveler shares a partial secret, revealing all the transactions recorded under his name. Furthermore, the traveler is only able to either refuse the sharing or share the full set of transactions: any attempt at hiding or tampering with some of the transactions will be directly detected by the verifier entity. The process may also preserve the future privacy of the travelers, as even if a traveler agreed to share a partial secret with a third party, new transactions will become again confidential and unlinkable even to this third party.

FIG. 1 shows a schematic view illustrating a registration workflow for a method according to an embodiment of the invention. According to step 1 as illustrated in FIG. 1, the traveler provides some private personal information to the Identity Manager (IM) that will use the personal information of the traveler to derive a public key/secret key pair using identity-based encryption (IBE). The Identity Manager represents a trusted entity of the distributed ledger system. The Identity Manager may be represented and/or comprised by an airline entity of an Airline Hub or of an immigration office entity of a local government.

According to step 2, the Identity Manager registers the public key of the traveler on the blockchain, in particular on the global identity blockchain, before sending the secret key back to the traveler (cf. step 3 illustrated in FIG. 1). After a while, the traveler may want to deregister and exercise his right to be forgotten (cf. step 4 illustrated in FIG. 1). Later on, even if the traveler wishes to join again the distributed ledger system (cf. step 5 of FIG. 1), since the public key/secret key pair are derived from the traveler's personal information/data, the Identity Manager will derive again the same public key/secret key pair and directly detect that the traveler was already registered in the past. The Identity Manager can therefore simply return the secret key (which may also be designated as private key) to the traveler again. Since the public key of the traveler did not change, the traveler's travel history is still recorded on the blockchain. Therefore, the traveler is unable to hide his travel history to the different entities (which may represent different companies) of the distributed ledger system.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for supporting sharing of travel history of travelers in airports, wherein identities of the travelers is managed using a distributed ledger system, wherein the distributed ledger system includes a global identity blockchain and several per segment security blockchains, wherein the global identity blockchain is accessible by entities of the distributed ledger system, and wherein a per segment security blockchain is employed for a predetermined flight segment, such that the per segment security blockchain is accessible only by entities of the distributed ledger system that are involved in the predetermined flight segment, the method comprising:
receiving, by a trusted entity of the distributed ledger system, a registration request from a traveler via a traveler application, wherein the registration request provides personal information of the traveler to the trusted entity;
generating, by the trusted entity, a public key for the traveler using an identity-based encryption mechanism, wherein the public key is based on the personal information of the traveler;
sending, from the trusted entity to the global identity blockchain, a registration transaction with respect to the traveler, wherein the registration transaction comprises the public key of the traveler in order to be registered in the global identity blockchain;
recording a travel history that includes all travel tickets of the traveler, wherein a Merkle tree of all the travel tickets of the traveler is generated, wherein the Merkle tree has a Merkle root, and wherein the Merkle root of the Merkle tree is stored in the global identity blockchain.

2. The method according to claim 1, wherein the personal information of the traveler provided to the trusted entity includes information that is uniquely associated with the traveler, wherein the personal information includes a passport number, a date of birth and/or a name of the traveler.

3. The method according to claim 1, wherein the trusted entity generating the public key for the traveler provides a unique key pair (pk, sk) that identifies the traveler in the distributed ledger system, wherein pk represents the public key that is recorded in the global identity blockchain, wherein sk represents a secret key that is returned to the traveler, and wherein the secret key sk is employed as decryption key.

4. The method according to claim 1, wherein the registration of the traveler's public key in the global identity blockchain provides an account on which the travel history of the traveler is able to be shared.

5. The method according to claim 1, wherein the trusted entity of the distributed ledger system is an airline entity.

6. The method according to claim 1, wherein the method further comprises:
receiving, by the per segment security blockchain, a new ticket transaction that is issued by an airline entity of the per segment security blockchain, wherein said ticket transaction comprise information on the identity of the traveler and information on the time of journey.

7. The method according to claim 1, wherein the method further comprises:
granting, to an entity of the per segment security blockchain, access to a set of travel tickets of the traveler.

8. The method according to claim 7, wherein the method further comprises:
recomputing, by the entity of the per segment security blockchain, the Merkle tree of the traveler based on the set of travel tickets in order to check whether any travel ticket is missing or has been modified.

9. The method according to claim 1, wherein the method further comprises:
issuing, by an airline entity of the per segment security blockchain, an update Merkle tree transaction for the traveler, wherein the update Merkle tree transaction includes a new travel ticket.

10. The method according to claim 9, wherein the airline entity issuing the update Merkle tree transaction updates the traveler's Merkle root that is recorded in the global identity blockchain.

11. The method according to claim 1, wherein all airline entities of the distributed ledger system are configured to support trusted execution environments (TEEs) such that a respective TEE is provided for each respective airline, and wherein all airlines form a ring signature system using their respective TEEs.

12. The method according to claim 1, wherein the travel tickets of the traveler are stored in secure cloud storage.

* * * * *